March 8, 1938.   J. E. GAEDE   2,110,596
BOB FOR A FISHING LINE
Filed May 28, 1935
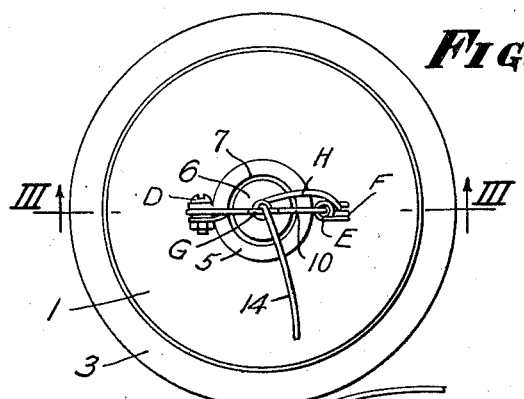
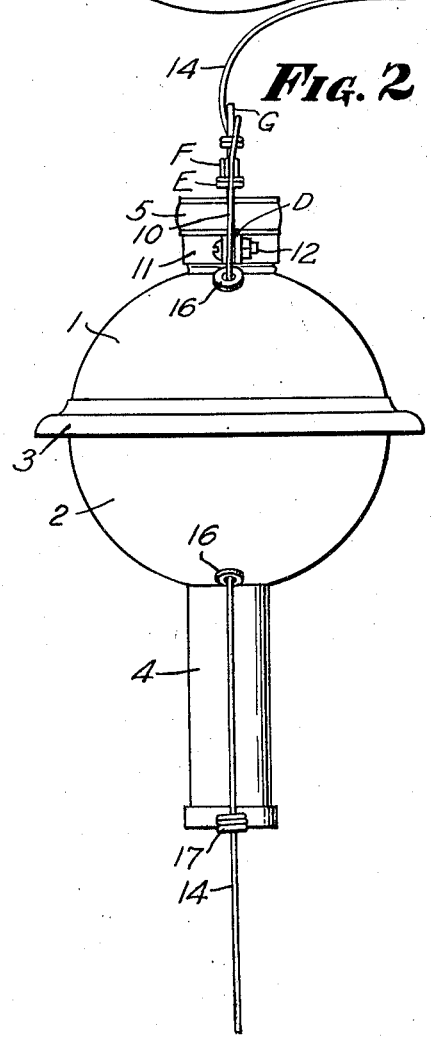
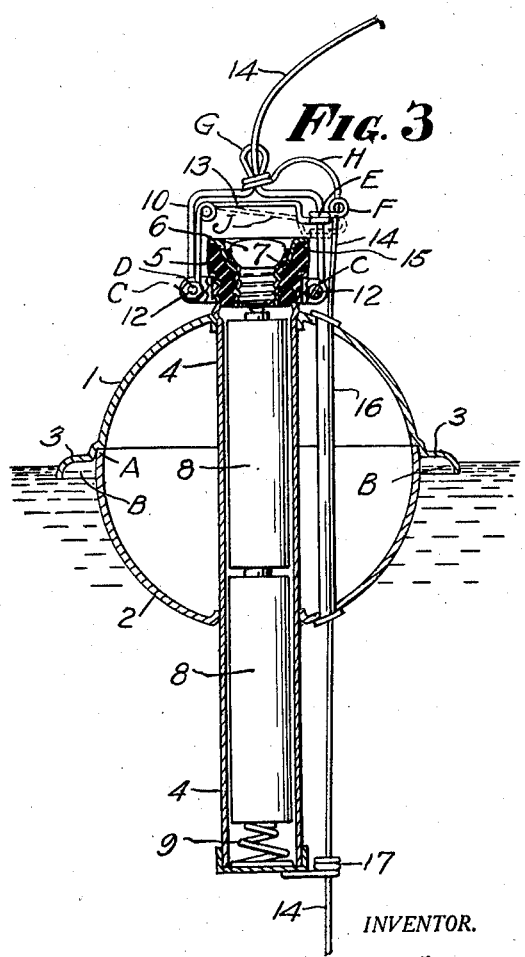
INVENTOR.
John E. Gaede
BY U. G. Charles
ATTORNEY.

Patented Mar. 8, 1938

2,110,596

UNITED STATES PATENT OFFICE 2,110,596

BOB FOR A FISHING LINE

John E. Gaede, Newton, Kans., assignor to William S. Goertzen, Newton, Kans.

Application May 28, 1935, Serial No. 23,810

2 Claims. (Cl. 43—17)

My invention relates to a bob for a fishing line.

The object of my invention is to provide a bob that is hollow, the shell thereof being fluid tight to float and having sufficient buoyancy to carry an electric lamp battery and circuit closing means, the hook, sinker and line extending downward from the bob and also to resist the jerk of a fish or the like upon the hook to close the circuit for lumination of the lamp to attract attention whether it be day or night time fishing.

A further object of my invention is to provide an annular down-turned flange as an auxiliary air chamber for increased resistance at the time of submerging the bob.

A still further object of my invention is to provide a switch as closing means for the circuit and positioned well above normal water line prior to submersion of the bob.

A still further object of my invention is to provide a bob spherical in form and having means to insert a fishing line therethrough near the center axis vertically with respect to its normal floating position.

These and other objects will hereinafter be more fully explained, reference being had to the accompanying drawing forming a part thereof and in which similar characters will apply to like parts in the different views.

Referring to the drawing:

Fig. 1 is a top or plan view of the bob.

Fig. 2 is a side view thereof.

Fig. 3 is a sectional view on line 3—3 in Fig. 1.

The invention herein disclosed consists of a hollow spherical element comprising upper and lower shell portions 1 and 2 respectively, the said portions being joined by an interlap as at A to form a fluid tight joint, the upper shell portion 1 having an annular concavo-convex flange 3 integral therewith, the concavity thereof being on the under side and functioning as an air chamber for additional buoyancy when the bob is submerged, the principle of which is illustrated in Fig. 3 as at B—B. Diametrically extending through the said spherical element is a battery housing tube 4 secured therein fluid tight and having on the upper end a lamp socket 5 threadedly engaging therewith fluid tight and arranged to receive a lamp 6 also threadedly engaging and made fluid tight by snug engagement with a rubber gasket 7 between the lamp and inside wall of the socket. The lower end of the said tube extends outward as a counterbalance to insure a desired position of the bob while floating and the said tube forms a housing for batteries 8 that are held upward in contact with the lamp base by a spring 9 seated in the bottom of the said tube and may be removed from the lamp socket end of the tube. Secured through the medium of a clamp 11, to the end of the tube 4 adjacent the lamp socket is a bail 10. The clamp is made in two parts to engage snugly around the said tube, and each part has an outturned apertured ear C through which bolts 12 extend as tensioning means to hold each end of the bail secure and also one end of a resilient switch element 13 as at D. The other end of the said switch has a coil E to slide on its respective arm of the bail when moved by the line 14 that is slidably held by coil F formed on the outer free end of the switch, the said line being secured to the loop G of the bail and having a slack portion as at H to permit movement of the switch to the position shown by dotted lines J in contact with the lamp socket lining 15 closing the circuit, the action of which (when in active service) is caused by the jerk of a fish upon a hook pendently carried by the portion of line extending downward from the bob. Therefore, evidence of a pull on the line is discernible in the dark. Extending through the shell of the bob in close proximity to the battery tube is a conductor 16 both ends of which are secured fluid tight to the shell and through which extends the line 14 which also extends through an eyelet 17 secured to the bottom of the battery tube, by which means straight alignment from the switch coil clamp F to the eyelet 17 is had for free movement of the fishing line to make and break the circuit and also to insure full retraction of the switch to its open position. The space between the points of contact when separated is sufficient to avoid capiliarity when the bob has emerged and is floating normally upon the water. Such modifications may be employed as lie within the appended claims.

Having fully described my invention what I claim as new and desire to secure by Letters Patent is:—

1. In a bob for a fishing line, a hollow spherical element, a tube for batteries diametrically passing through the said element, and secured thereto, one end of which extends outwardly a greater distance than the other, an electric lamp and batteries carried by the tube, a switch and a bail positioned on the lesser extending end of the tube, the switch to control the circuit being between the battery and the lamp and being guided by the bail in its swinging movement, means to attach a line to the bail, the switch and the greater extending end of the said tube, and means to conduct the line through the said hollow spherical structure.

2. In a bob for a fishing line, a hollow spherical element, a flange on the exterior of the element outwardly extending and positioned on the center zone thereof, a battery tube diametrically extending through the spherical element transverse to the flange, batteries in the tube, the tube having an electric lamp positioned on one end thereof, a looped bail and an electric circuit closing switch secured to the tube adjacent the lamp end of said tube, resilient means to hold the batteries in connection with the lamp, the line being secured to the loop of the bail, a clamp means on the switch to engage the line, means to conduct the line through the spherical body, and an eye on the opposite end of the tube from the lamp through which the line will slidably engage.

JOHN E. GAEDE.